United States Patent [19]

Iwasawa et al.

[11] Patent Number: 4,821,181

[45] Date of Patent: Apr. 11, 1989

[54] METHOD FOR CONVERTING A SOURCE PROGRAM OF HIGH LEVEL LANGUAGE STATEMENT INTO AN OBJECT PROGRAM FOR A VECTOR PROCESSOR

[75] Inventors: Kyoko Iwasawa, Tokyo; Yoshikazu Tanaka, Saitama, both of Japan

[73] Assignee: Hitachi, Ltd., Tokyo, Japan

[21] Appl. No.: 947,520

[22] Filed: Dec. 29, 1986

[30] Foreign Application Priority Data

Jan. 8, 1986 [JP] Japan .................................... 61-562

[51] Int. Cl.$^4$ .............................................. G06F 9/44
[52] U.S. Cl. .................................... 364/200; 364/300
[58] Field of Search ................ 364/200 MS File, 300, 364/900 MS File

[56] References Cited

U.S. PATENT DOCUMENTS

| | | | |
|---|---|---|---|
| 4,309,756 | 1/1982 | Beckler | 364/300 |
| 4,398,249 | 8/1983 | Pardo et al. | 364/300 |
| 4,567,574 | 1/1986 | Saadé et al. | 364/900 |
| 4,571,678 | 2/1986 | Chaitin | 364/300 |
| 4,672,532 | 6/1987 | Jonge Vos | 364/200 |
| 4,710,872 | 12/1987 | Scarborough | 364/300 |
| 4,722,071 | 1/1988 | Gates et al. | 364/900 |

FOREIGN PATENT DOCUMENTS

| | | |
|---|---|---|
| 2123995A | 2/1984 | United Kingdom . |
| 2159309A | 11/1985 | United Kingdom . |

OTHER PUBLICATIONS

Kamiya et al., "Practical Vectorization Techniques for the 'Facom VP'", IFIP, 1983, pp. 389–394.
Odaka, T. et al., "Hitachi Super Computer S-810 Array System", Supercomputers, Class VI Systems, Hardware and Software, Elsevier Sci. Pub. B.V. 1986, pp. 113–135.

*Primary Examiner*—Gareth D. Shaw
*Assistant Examiner*—Maria Napiorkowski
*Attorney, Agent, or Firm*—Saidman, Sterne, Kessler & Goldstein

[57] ABSTRACT

Vectorization is enabled in a source program having a conditional branch in a loop in which a sequence of definition and reference of data is disordered by the vectorization. A statement reordering part having a conditional statement moving part, and a loop splitting part are provided in an automatic vectorization processing part of a compiler. The statement reordering part reorders the statements by moving the statements in the source grogram to any desired position so that the sequence of definition and reference of data is converted to the vector instructions. If the statement to be moved is a conditional one, the associated condition statement is also copied and moved together with it. The loop splitting part splits the source program loop into a vector loop and a scaler loop when the loop in the source program contains both statements which can be vectorized and statements which can not be vectorized. If a split point is under a condition statement, the condition statement is copied into the scaler loop and the vector loop. As a result, the execution condition for the statements does not change before and after the loop split. In this manner, the portion which can not be vectorized is minimized for the loop which contains the conditional branch.

4 Claims, 14 Drawing Sheets

```
Do 10  I = 1, N
   A(I) = B(I) * C(I) + Z(I)           —16
   IF (Z(I+1).GT.0.0)  THEN            —17
      D(I) = D(I) + A(I)               —18
   ELSE
      Z(I+1) = 0.0                     —19
   END IF
   IF (D(I).LE.A(I))  THEN             —20
      Q(I) = E(I) / F(I)               —21
      P(I) = QCMPLX(E(I),F(I))/QCMPLX(X,Y) —22
   END IF
10 CONTINUE
```

FIG. 11

```
Do 10 I=1,N
    TMPI(I)=Z(I+1).GT.0.0          ~35
    IF (TMPI(I)) THEN              ~36
    ELSE
        Z(I+1) = 0.0               ~19'
    END IF
    A(I) = B(I) * C(I) + Z(I)      ~16
    IF (TMPI(I)) THEN              ~17'
        D(I) = D(I) + A(I)         ~18
    END IF
    IF (D(I).LE.A(I)) THEN         ~20
        Q(I) = E(I) / F(I)         ~21
        P(I) = QCMPLX(E(I),F(I))/QCMPLX(X,Y)  ~22
    END IF
10 CONTINUE
```

FIG. 13

```
Do 10 I = 1, N
    TMP1(I) = Z(I+1).GT.O.O        —35
    IF (TMP1(I)) THEN              —36
    ELSE
        Z(I+1) = O.O               —19'
    END IF
    A(I) = B(I) * C(I) + Z(I)      —16
    IF (TMP1(I)) THEN              —17'
        D(I) = D(I) + A(I)         —18
    END IF
    TMP2(I) = D(I).LE.A(I)         —56
    IF (TMP2(I)) THEN              —57
        Q(I) = E(I) / F(I)         —21'
    END IF
    IF (TMP2(I)) THEN              —59
        P(I) = QCMPLX(E(I),F(I)) / QCMPLX(X,Y)   —22
    END IF
10  CONTINUE
```

FIG. 14

```
Do 10' I = 1, N
    TMP1(I) = Z(I+1).GT.0.0           ~35
    IF (TMP1(I)) THEN                 ~36
    ELSE
        Z(I+1) = 0.0                  ~19'
    END IF
    A(I) = B(I)*C(I)+Z(I)             ~16        ⎫
    IF (TMP1(I)) THEN                 ~17'       ⎪
        D(I) = D(I)+A(I)              ~18        ⎬ 61
    END IF                                       ⎪
    TMP2(I) = D(I).LE.A(I)            ~56        ⎪
    IF (TMP2(I)) THEN                 ~57        ⎪
        Q(I) = E(I)/F(I)              ~21'       ⎪
    END IF                                       ⎭
10' CONTINUE
Do 10" I = 1, N                                  ⎫
    IF (TMP2(I)) THEN                 ~59        ⎪
        Q(I) = QCMPLX(E(I),F(I))/QCMPLX(X,Y) ~22 ⎬ 62
    END IF                                       ⎪
10" CONTINUE                                     ⎭
```

FIG. 15

$TMP1(1:N) = Z(2:N+1).GT.0.0$ ∼35'
$Z(2:N+1) = 0.0$ if $TMP1(1:N).EQ.false$ ∼19''
$A(1:N) = B(1:N) * C(1:N) + Z(1:N)$ ∼16''
$D(1:N) = D(1:N) + A(1:N)$
&                    if $TMP1(1:N).EQ.true$ ∼18''
$TMP2(1:N) = D(1:N).LE.A(1:N)$ ∼56'
$Q(1:N) = E(1:N) / F(1:N)$
&                    if $TMP2(1:N).EQ.true$ ∼21''

```
Do 10"  I = 1, N
   IF (TMP2(I)) THEN     ∼59
      Q(I) = QCMPLX(E(I),F(I))/QCMPLX(X,Y) ∼22
   END IF
10" CONTINUE
```
} 62

METHOD FOR CONVERTING A SOURCE PROGRAM OF HIGH LEVEL LANGUAGE STATEMENT INTO AN OBJECT PROGRAM FOR A VECTOR PROCESSOR

BACKGROUND OF THE INVENTION

The present invention relates to the compiling of a source program, and more particularly to a method for generating an object program suitable for improving an execution speed to a DO loop which contains a branch instruction.

A vector processor has a vector processing unit which processes a set of array data in a block. One example of such vector processor is Hitachi S-810. The vector processor has a function to execute a one-dimension parallel operation instruction called a vector instruction under a pipeline control.

For example, in a FORTRAN source program, an iterative operation such as

DO 10 I=1, N
10 Z(I)=X(I) +Y(I)

can be executed by one vector instruction $Z(1:N)=X(1:N)+Y(1:N)$ which instructs to place a sum of elements 1−N of an array X and elements 1−N of an array Y, into elements 1−N of an array Z. The conversion to such a vector instruction is called vectorizatoon and the array data X, Y, Z are called vectors.

When the DO loop contains an IF clause, for

DO 10 I=1, N
IF (A(I), GT, B(I)) THEN Z(I)=X(I) +Y(I)
ENDIF
10 CONTINUE it can be executed by the vector processor by the following control vector method. In a hardware aspect, a control vector $C$ is introduced in addition to the vectors $X$, $Y$ and $Z$ which are direct objects of operation, and operations between Xi and Yi are controlled depending on whether a bit Ci of $C$ is "0" or "1". A principle of operation when the vector instruction described above is under control of the control vector $C$ is explained below.

A control vector generation instruction and two vector instructions for calculating Z under control of the control instruction are executed.

$C(1:N)=A(1:N)\cdot GT\cdot B(1:N)$
$Z(1:N)=X(1:N)+Y(1:N)$
if $C(1:N)=$true

If a value of an i-th element of an array A is larger than a value of an i-th element in an array B, an i-th element of the control vector C is set to true (1) and the above process is repeated for i=1−N. Only when the i-th element of the control vector C is true (1), a sum of the value of the i-th element of the array X and the value of the i-th element of the array Y is stored into the i-th element of the array Z. The above step is repeated for i=1−N. Thus, a result obtained by looping a scalar process and the result obtained by executing those two vector instructions are equal. In this manner, the loop which contains a conditional branch clause can be vectorized.

A compiler determines whether the DO loop can be converted to the vector instruction based on a sequence/data dependence of setting (definition) of arrays and variables in the source program and use (reference) of the arrays and variables.

The above vector processor or compiler technique is disclosed in "Super Computers, Class VI Systems, Hardware and Software" published by Elserier Science Publishers B. V. (North Holland), pages 113-135, and "Hitachi Super Computer S-810 Array Processor System".

In the prior art system described above, if the loop contains a conditional branch instruction and if the loop resulted in disordering of a sequence of definition and reference of data by converting to a set of vector instructions, the compiler converted the loop to the set of vector instructions, an error may be included in an executed result.

SUMMARY OF THE INVENTION

It is an object of the present invention to enable vectorization in a program having a conditional branch in a loop in which a sequence of definition and reference of data is disordered by the vectorization, by conditionally moving a sentence which is to be executed only when a condition is met (or not met) to an appropriate position.

It is another object of the present invention to copy the same condition sentence into a scalar loop and a vector loop in order to split into the scalar loop a portion of sentences which is to be executed only when a condition in a loop is met (or not met) but cannot be vectorized in view of data dependency and hardware restriction and split into the vector loop another sentence which is to be executed only when the same condition as above is met (or not met) and which can be vectorized.

The above objects are achieved by providing a conditional statement copying and moving part in a statement reordering part and loop splitting part in automatic vectorization processing part of the compiler.

The statement reordering part reorders the statements by moving the statements in the source program to any desired positions so that the sequence of definition and reference of data is converted to the vector instructions. If the statement to be moved is a conditional one, the condition statement is copied and the statement is moved together with the condition statement.

The loop splitting part splits the DO loop into a vector loop and a scalar loop when the DO loop in the source program contains both statements which can be vectorized and statements which cannot be vectorized. If a split point (a boundary of the statements which can be vectorized and the statements which cannot be vectorized) is under a condition statement, the condition statement is copied into the scalar loop and the vector loop. As a result, the execution condition for the statements does not change before and after the loop split.

In this manner, the portion which cannot be vectorized is minimized for the loop which contains the conditional branch.

FIG. 1 shows a configuration relating to the movement of statements by copying of the condition statement and the loop splitting in the automatic vectorization part. The statement reordering part, loop splitting part and conditional statement moving part function in the following manner to a loop which contains a conditional branch.

The statement reordering part reorders the statements such that the data dependency which shows the sequence of definition and reference of data does not change after the conversion of the statements to a set of vector instructions. When the sequence of data definition and reference are represented by an arrow having a start point and an end point, the statements are reordered such that the start point is always executed prior to the end point. The statements are serially retrieved, and if a data dependency having a corresponding statement as a start point and having a statement as an end point which is to be executed prior to the start point is retrieved, the corresponding statement is moved in front of the statement as the end point in order to be executed prior to the statement as to the end point. By reordering the statements in this manner, the data dependency is not disturbed when the statements are converted to the set of vector instructions for execution by a vector processor.

If the statement to be moved is one which is to be executed only when a certain condition is met (or not met), the condition statement is copied by the conditional statement moving part and the statement is moved such that it is executed only when the condition is met (or not met).

The loop splitting part splits the loop such that those statements which can be converted to a set of vector instructions and those statements which cannot be converted to a set of vector instructions in view of the data dependency and hardware restriction but are to be converted to a set of scalar instructions, belong to different groups. To this end, a new loop is prepared and only those statements which are to be converted to the set of vector instructions (or the set of scalar instructions) are moved into the new loop. If a boundary of the statements which are to be converted to the set of vector instructions and the statements which are to be converted to the set of scalar instructions is under a statement which is to be executed only when a certain condition is met (or not met), the condition statement is copied by the conditional statement moving part, and only the statements to be converted to the set of vector instructions (or scalar instructions) are moved so that they are executed only when the condition is met (or not met). Thus, the loop may be split at any split point in the loop. After the splitting, the loops are converted to the set of vector instructions and scalar instructions.

BRIEF DESCRIPTION OF THE DRAWINGS

FIG. 11 shows a program, after conversion, of the statement reordering part;

FIG. 13 shows a program after movement of a conditional statement;

FIG. 14 shows a program after loop splitting; and

FIG. 15 shows a program after conversion to a set of vector instructions.

DESCRIPTION OF THE PREFERRED EMBODIMENTS

Figure 2:
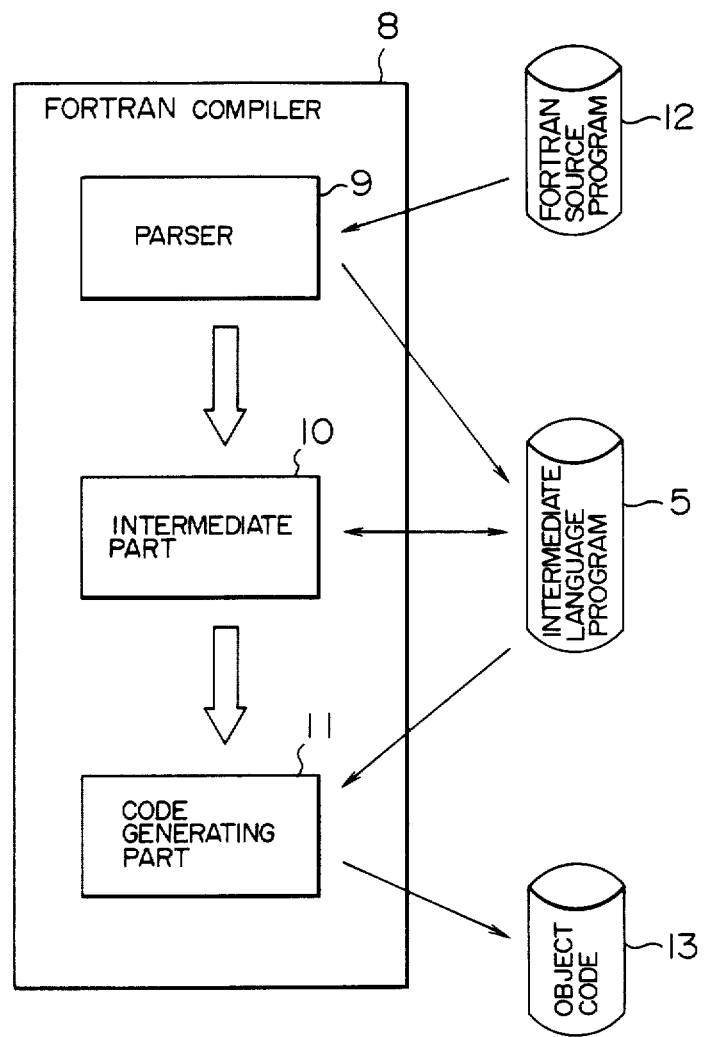
FIG. 2 shows a configuration of a FORTRAN compiler.

FIG. 2 shows an overall structure of a FORTRAN compiler program 8 in accordance with the present invention. A parser 9 in FIG. 2 translates a FORTRAN source program 12 into an intermediate language program 5. An intermediate language processor 10 vectorizes and optimizes the intermediate language program 5 to modify the intermediate language program 5. A code generator 11 generates an object code 13 based on the modified intermediate language program 5. It includes both scalar instructions and vector instructions. The present invention relates to the intermediate language processor 10.

Figure 1:
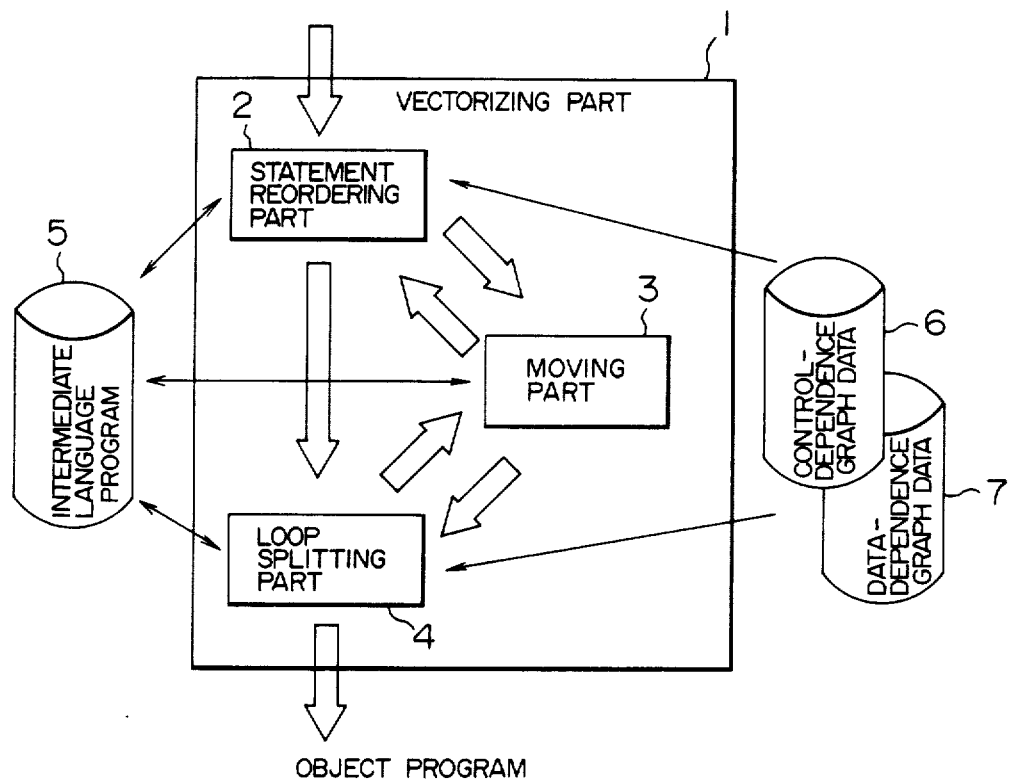
FIG. 1 shows a configuration of a vectorizing part in a compiler.
Figure 3:
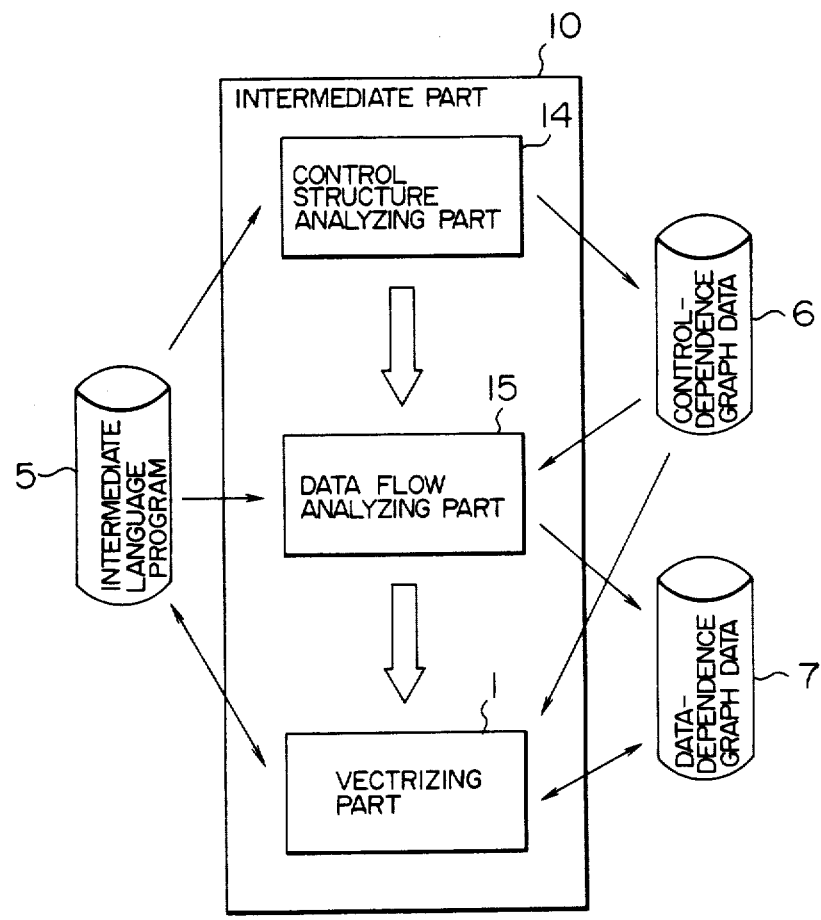
FIG. 3 shows a configuration of an intermediate language processing part.

FIG. 3 shows the vectorizing part of the intermediate language processor 10 of FIG. 2, and FIG. 1 shows the conditional statement moving part of the vectorizing part of FIG. 3.

Figures 4, 5:
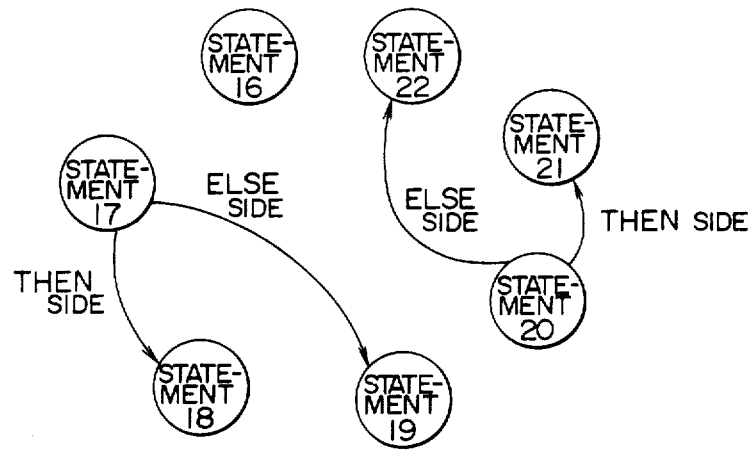
FIG. 4 shows an example of FORTRAN source program.
FIG. 5 shows a condition dependence graph data.

Let us assume that a FORTRAN program shown in FIG. 4 is used as the input source program 12 of FIG. 2, and a condition statement is copied so that the statement is moved with condition. If the program shown in FIG. 4 is converted to vector instructions without moving a statement to be described below, a result includes an error. In the prior art compiler, therefore, the loop cannot be executed by a vector processor and the entire loop is converted to scalar instructions. This is because statements 16, 17, 18 and 19 cannot be converted to vector instructions because of data dependency and there is no vector instruction which can process tetraprecision data of a statement 22.

Control structure analyzing part 14 of FIG. 3 analyzes a control flow of the source program 12 to prepare condition dependence graph data 6. The condition dependence requires that branching which uses an evaluation of condition and a result thereof must be executed prior to a statement which is to be executed only when the condition is met (or not met). The program shown in FIG. 4 includes the condition dependence shown in FIG. 5. The statement to be executed earlier is shown by a start point of an arrow and the statement to be executed later is shown by an end point. The control structure analyzing part 14 produces condition dependence graph data 6 shown in FIG. 6. In a table 99, one record is prepared for each statement in the source program 12. In order to represent a condition dependency having a statement as a start point or end point, the record has a start point field and an end point field. A start point field 101 of a record 100 for a statement 17 points to an end point statement of condition dependence whose start point is the statement 17. As seen from the source program shown in FIG. 4 and the condition dependence shown in FIG. 5, there are two condition dependences having the statement 17 as the start point. The end points thereof are statements 18 and 19. Records 103 and 104 are prepared therefor. In order to indicate whether the statements 18 and 19 are to be executed when a condition is met or not met, a field 105 is prepared and THEN or ELSE is registered therein. Since the statement 17 is to be executed irrespective of the condition, it is not the end point of the condition dependence. Accordingly, no data is registered in the end point field 102 of the statement 17.

Figure 6:
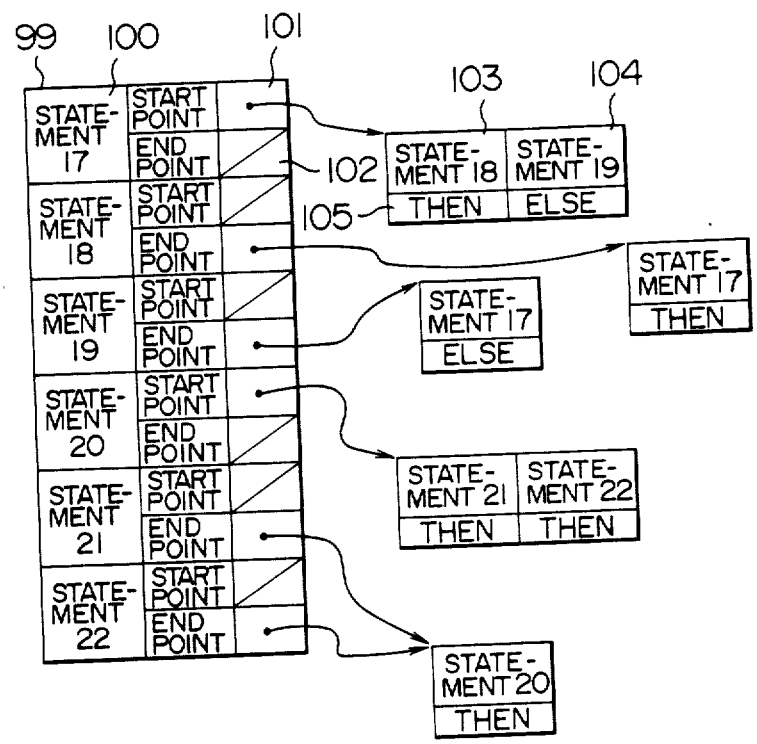
FIG. 6 shows a structure of the condition dependence graph data.
Figure 7:
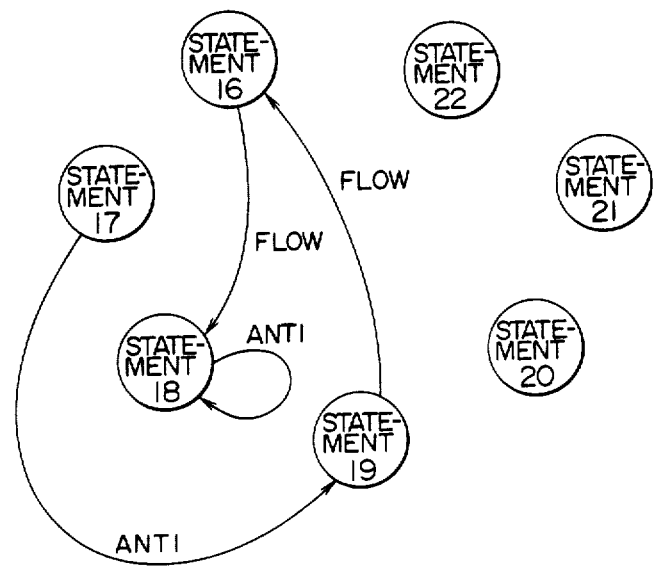
FIG. 7 shows a data dependence graph.

The data flow analyzing part 15 of FIG. 3 then receives the intermediate language program 5 and the condition dependence graph data 6 having the data structure shown in FIG. 6, and analyzes the data flow to prepare data dependence graph data 7. The data dependence graph shows a sequence of execution of definition and reference of data, by arrows. FIG. 7 shows a data dependence graph for the program shown in FIG. 4. A statement to be executed earlier is shown by a start point of an arrow, and a statement to be executed later is shown by an end point. The data from analyzing part 15 produces data dependence graph data 7 shown in FIG. 8. In table 110, one record is prepared for each statement of the source program. In order to represent condition dependence having a statement as a start point or end point, the record has a start point field and an end point field. A format of expression of the data dependence is exactly the same as that of the condition dependence. $Z(I+1)$ defined by a statement 19 is referenced by $Z(I)$ of a statement 16 after one circulation of the loop. This is referred to as flow dependence. The start point of the flow dependence is the statement 19, and the end point is the statement 16. Since the end point of the dependence having the statement 19 as the start point is the statement 16, the start point field 111 of the statement 19 points to the record 113 of the statement 16. The flow is registered in a field 114 which indicates a type of data dependence. $Z(I+1)$ defined in the statement 19 cannot be executed before the statement 17 refers $Z(I+1)$. After the statement 17 has used $Z(I+1)$, the statement 19 defines a new value for $Z(I+1)$ and destroys the value to which the statement 17 referred to. This is referred as anti dependence. The start point of the anti dependence is the statement 17 and the end point is the statement 19. Accordingly, the end point field 112 of the statement 19 points to the record 115 of the statement 17, and "anti" is registered in the field 116 which indicates the type of data dependence.

Figure 8:
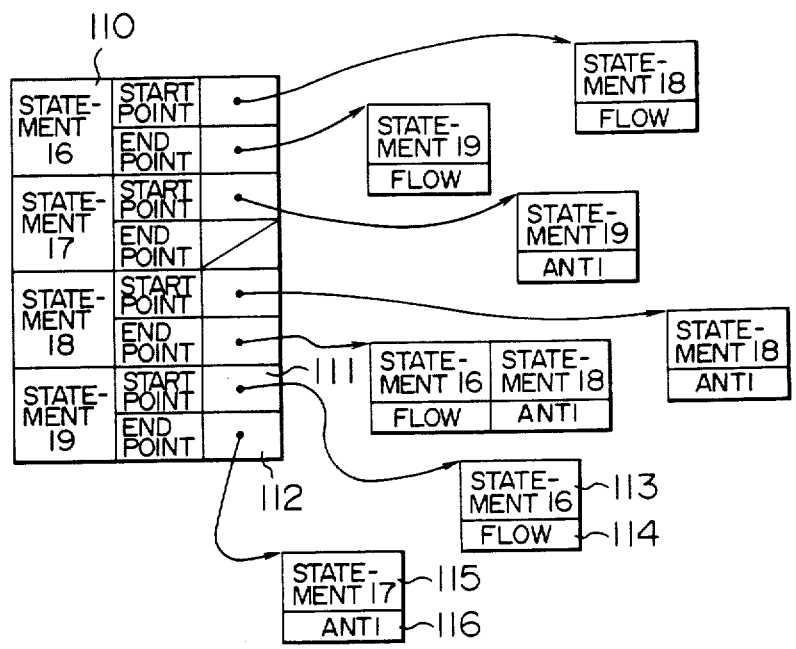
FIG. 8 shows a data structure of the data dependence graph.

The condition dependence of FIG. 6 and the data dependence of FIG. 8 are all dependences of the statements of the source program of FIG. 4. The compiler may move the statement to any desired position so long as the dependences are not disturbed.

The automatic vectorizing part 1 receives the condition dependence graph 6 having the data structure shown in FIG. 6 and the data dependence graph 7 having the data structure shown in FIG. 8, and converts the intermediate language program 5 into a form compatible to the vector instructions.

Figure 9:
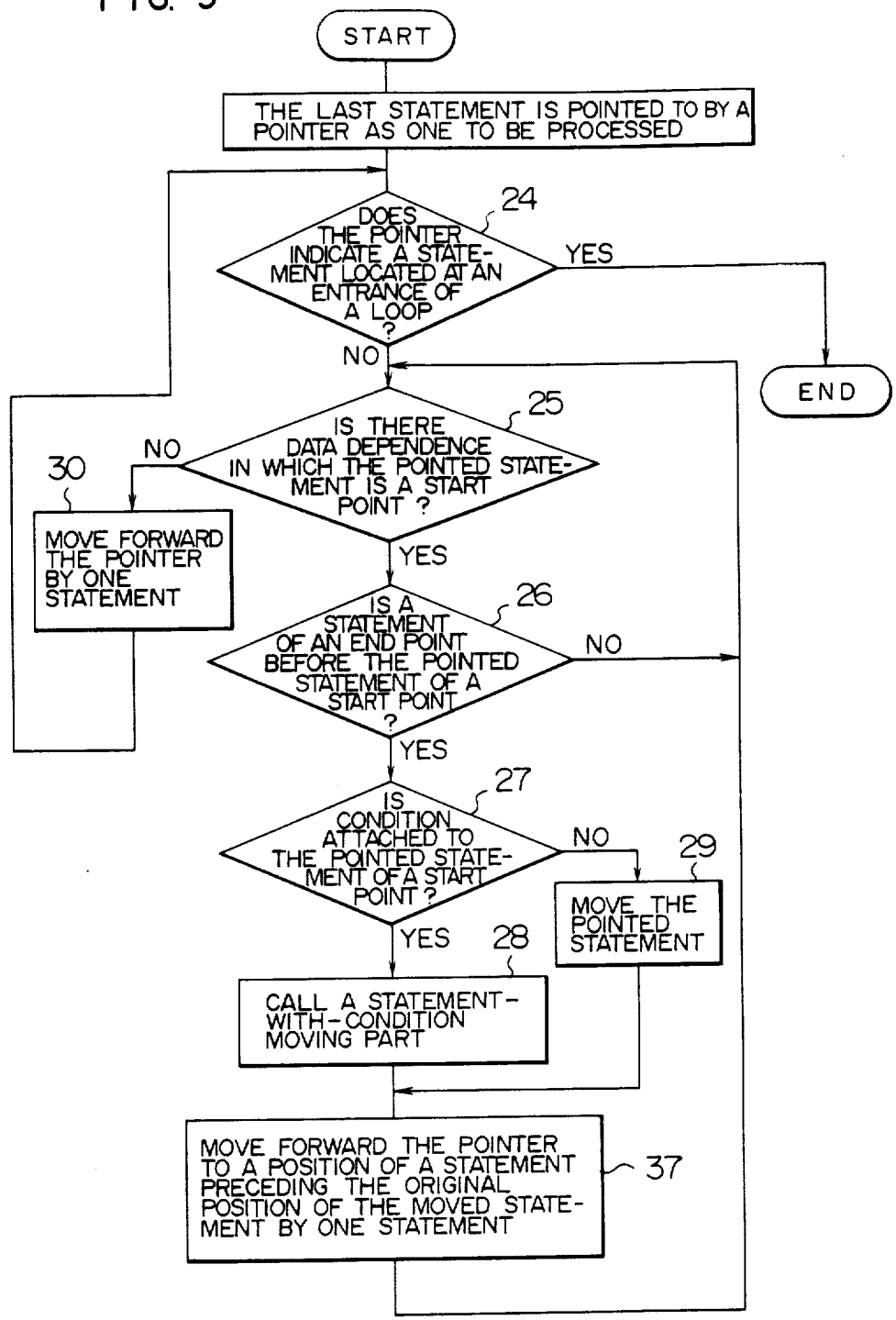
FIG. 9 shows a process flow of a statement reordering part.

As shown in FIG. 1, the vectorizing part 1 comprises statement reordering part 2, conditional statement moving part 3 and loop splitting part 4. The statement reordering part 2 reorders the statements such that the data dependence is not disturbed by the vectorization. This process is shown by a flow chart in FIG. 9.

For a DO loop to be processed, the statements are serially processed one statement at a time, starting from the last statement. To this end, in a step 23, a pointer which points to a statement being processed is set to point to the last statement in the loop. In a step 24, whether all statements in the loop have been processed or not is checked. If the starting statement of the loop has been processed and the pointer points to an entry, the process is terminated. In a step 25, whether the statement to be processed (pointed to by the pointer) is the start point of the data dependence or not is checked. If the statement to be processed (pointed to by the pointer) is the start point of the data dependence, the process proceeds to a step 26, and if it is not the start point, the process proceeds to a step 30. In the step 30, the pointer is updated to point to the preceding statement, and the next statement is processed. If the statement to be processed is the start point of the data dependency, the process proceeds to the step 26 where whether the statement which is the end point of the data dependence is to be executed before or after the statement which is the start point is checked. If the end point statement is behind the start point statement, there is no movement. If the end point statement is in front of the start point statement, the process proceeds to a step 27 to move the statement in question (pointed to by the pointer) in immediate front of the end point statement. In the step 27, whether or not the statement to be moved is one which is to be executed only when a certain condition is met (or not met) is checked, and if it is independent from the condition, the process proceeds to a step 29 where the start point statement is moved in immediate front of the end point statement. If the statement to be moved is to be executed only when the condition is met (or not met), the conditional statement moving part 3 is called in a step 28 so that the start point statement with condition is moved in immediate front of the end point statement. After the movement, the process proceeds to step 37. In the step 37, the pointer which points to the statement to be processed is set to point the preceding statement to designate the next statement to be processed. Then, the process returns to the step 24.

In the example shown in FIG. 4, until the statement 19 is processed after the pointer has pointed to the statement 22 as the statement to be processed in the step 23, no statement is detected in the step 25 which has the data dependence having the statement to be processed as the start point. For the statement 19, the flow dependence is detected in the step 26 based on the data dependence graph of FIG. 8 which means that the statement 16 refers to the value defined by the statement 19. This means that the vectorization is not permitted in the condition of FIG. 4, because the sequence of data definition and reference will be changed by the conversion to the vector instructions. Accordingly, the statement 19 is moved in front of the statement 16.

The step 27 determines that the statement to be moved is to be executed under the condition 17 based on the condition dependence graph data 6 of FIG. 6, and calls the conditional statement moving part 3 (step 28).

Figure 10:
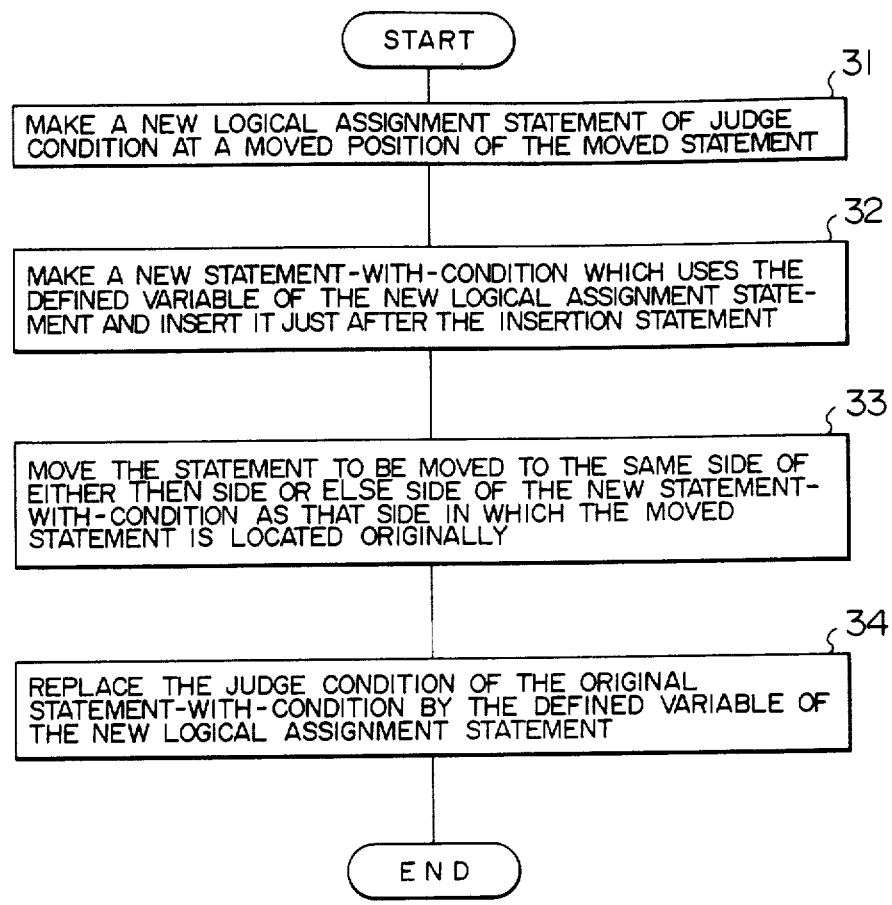
FIG. 10 shows a process flow of a conditional statement moving part.

FIG. 10 shows a flow chart of the process of the conditional statement moving part 3. In a step 31, a logical assignment statement of a condition for determining whether the statement to be moved is executable or not is prepared at a destination position, because an evaluation of the condition expression is not copied when the condition statement is copied. In a step 32, the condition statement is prepared at the destination position (immediately after the logical assignment statement) in order to copy the new condition statement. A decision condition for this condition statement is a logical variable in a left side of the logical assignment statement prepared in the step 31. In a step 33, the statement to be moved is moved under the condition statement prepared in the step 31 so that it is executed under the same condition as that before the movement. In a step 34, the condition expression of the original condition statement is substituted by the logical variable in the left side of the logical assignment statement prepared in the step 31. In this manner, duplicate evaluation of the condition expression is avoided.

In the example shown in FIG. 4, it is modified as shown in FIG. 11. Statement 20, 21, 22 in FIG. 4 aren't copied. Therefore, they are the same statements 20, 21, 22 in FIG. 11.

In the step 31, the statement 35 (FIG. 11) which is the logical assignment statement for the condition statement 17 "Z(I+1)·GT·0·0" of FIG. 4 is prepared immediately before the statement 16. In the step 32, the condition statement 36 is prepared immediately after the statement 35 of FIG. 11. The decision condition for the condition statement 36 is the logical variable defined by the statement 35. In the, step 33, the statement 19 is moved as a statement 19' under the condition of the statement 35 (in the same ELSE clause as that before the movement). Finally, in the step 34, a statement 17' which is a substitution of the decision condition of the condition statement 17 by the defined variable of the statement 35 is inserted to prevent waste in the judgement of the logical expression.

The processing of the statement reordering part 2 is thus completed and the control is delivered to the loop splitting part 4.

Figure 12:
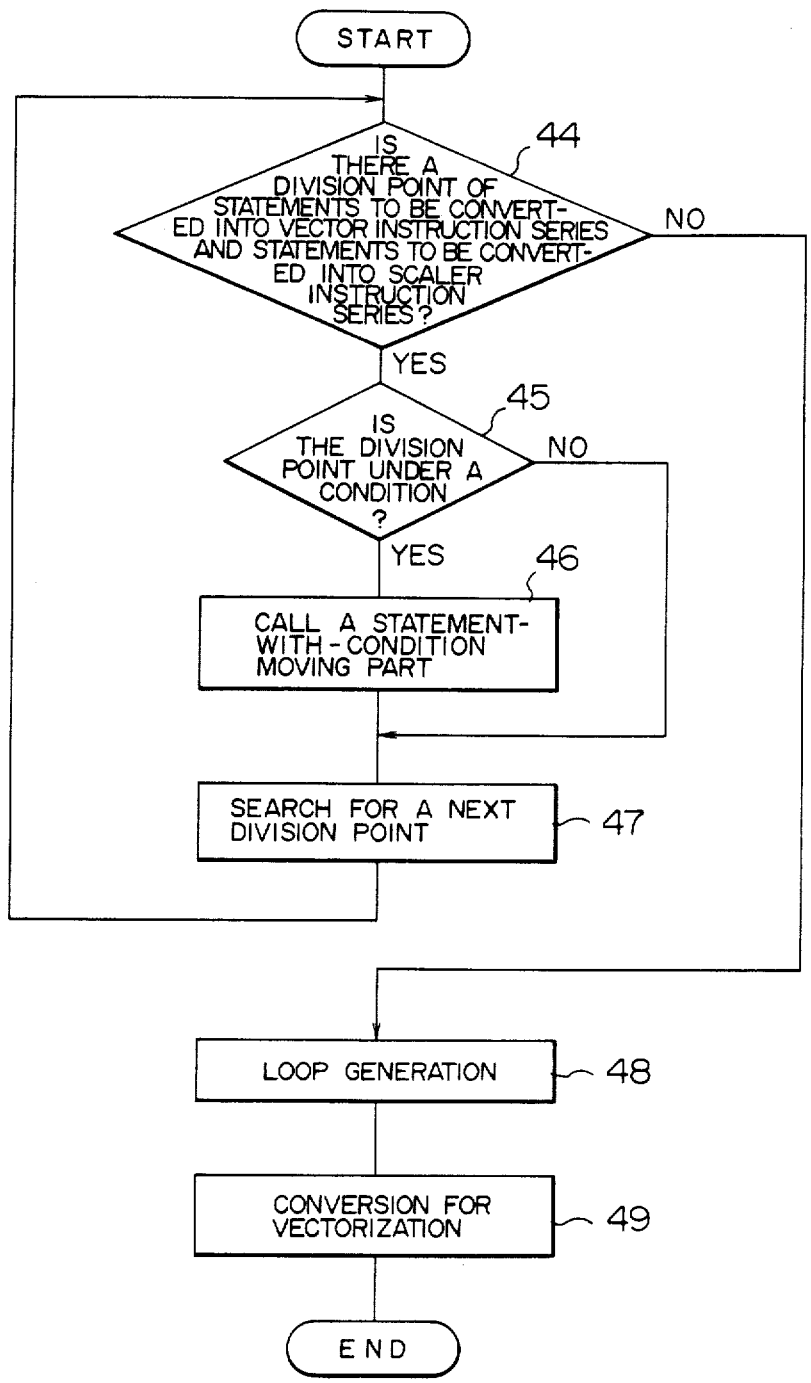
FIG. 12 shows a process flow of loop spliting.

The loop splitting part 4 splits one loop into a plurality of loops for those statements which can be vectorized and those statements which cannot be vectorized. FIG. 12 shows a flow chart of the process.

In a step 44, whether or not both the statements to be converted to the vector instructions and the statements to be converted to the scalar instructions exist in the loop to be processed is checked. If they do not exist, a loop which consists of only statements to be converted to the vector instructions (or scalar instructions) is generated, and the statements are converted to the vector instructions (or scalar instructions). If there is a split point, the process proceeds to a step 45. In the step 45, whether or not the split point is under the statement which is to be executed only when a certain condition is met (or not met) is determined. If the split point is at a position independent from the condition, no processing is performed, and if the split point is under the statement which is to be executed only when the certain condition is met (or not met), the conditional statement moving part 3 is called in a step 46. The conditional statement moving part 3 copies the condition statement and splits the statements into those statements which are to be converted to scalar instructions and those statements which are to be converted to vector instructions. After movement, in the step 47 process proceeds to the next split point.

In the example shown in FIG. 11, only the statement 22 requires a tetra-precision operation and it cannot be vectorized because no hardware for the corresponding vector instruction is provided. Other statements can be vectorized. Accordingly, the split point is between the statements 21 and 22. Based on the condition dependence graph data 6 of FIG. 6, it is determined that both statements 21 and 22 can be executed under the condition statement 20, and that the split point is under the condition, in a step 45. The conditional statement moving part 3 is called (in a step 46) and the statement is moved with condition so that the loop can be split between the statements 21 and 22.

In a step 31 of FIG. 10, a logical assignment statement 56 for placing the condition expression "D(I)·LE·A(I)" of the condition statement 21 into the logical variable is prepared immediately before the statement 21, as shown in FIG. 13. In step 32, a condition statement 57 which has the defined variable of the statement 55 as a decision condition is prepared immediately after the statement 56. Then, the statement 21 is moved to the THEN clause of the condition statement 57 to prepare a statement 21'. Finally, in a step 34, the decision condition of the original condition statement 20 is substituted by the defined variable of the statement 56 to prepare a statement 59. Thus, the processing of the conditional statement moving part 3 is completed and the control is delivered to the loop splitting part 4.

In the example shown in FIG. 11, since there is no other split point, a new loop is generated in a step 48 of FIG. 12 to prepare the loop which can be vectorized and the loop which cannot be vectorized as shown in FIG. 14. In a succeeding step 49, the loop 61 of FIG. 14 which can be vectorized is converted to a form compatible to the vector instructions. The loop 62 which cannot be vectorized is converted to scalar instructions (not shown) which are executed by a scalar processor. A statement 19' in FIG. 11 is not modified, therefore it is the same statement 19' in FIG. 13 and 19' in FIG. 14.

The loop which can be vectorized is represented by a specification of the vector instructions as shown in FIG. 15.

The statement 35' represents an instruction for generating a control vector. When the value from the second element to the (N+1)-th element is larger than 0.0, true (1) is set from the first element to the N-th element of control vector TMP1. Otherwise, false (0) is set. The statement 19" represents an instruction for placing 0.0 to the (i+1)th element of the array Z, where i=1−N, only when the i-th element of the control vector TMP1 is false (0). The statement 16" represents an instruction for placing a sum of a product of the i-th element of the array B and the i-th element of the array C, and the i-th element of the array Z to the i-th element of the array A, where i=1−N. The statement 18" represents an instruction for placing a sum of the i-th element of the array D and the i-th element of the array A to the i-th element of the array D only when the i-th element of the control vector TMP1 is true (1). The statement 56' represents an instruction for generating a control vector to set the i-th element of TMP2 to true (1) state only when the i-th element of the array D is smaller than the i-th element of the array A, and set to false (0) state in other cases, where i is 1−N. The statement 21" represents an instruction for placing a quotient of the i-th element of the array E divided by the i-th element of the array F to the i-th element of the array Q. The DO 10" loop 62 is converted to scalar instructions which are executed by the scalar processor. The scalar instructions are omitted here.

In accordance with the present invention, even if there is a condition statement in a loop and a control structure is complex, the statements can be rearranged for the vectorization or the statements which cannot be vectorized are minimized in accordance with the data dependence analysis result, in the same manner as that in the loop having no conditional branch. Accordingly, the rate for vectorization is improved and the execution speed of the generated object code is improved.

We claim:

1. A method for computer-converting a loop comprising statements to be iteratively executed included in a source program written in a high-level language, to an object program including vector instructions to be executed by a vector processor, comprising:

(a) a first step of detecting a set of first to third statements
  said first statement indicating execution of first data processing to refer to at least one element of array data comprising an ordered set of elements each having an element number;
  said second statement being executed after said first statement and indicating whether or not branching is to be done, in accordance with a value of a certain condition expression included in the second statement;
  said third statement being executed in a predetermined one of two cases, when branching is indicated by said second statement and when not, and indicating execution of second data processing to define a value of a larger-numbered element of the array data than the element number of the at least one element of the array data referred to in a same loop iteration by said first statement;
(b) a second step of generating, in response to the detection by the first step of the set of first to third statements, a set of vector instructions for executing first to third vector processing;
  said first vector processing producing vector data comprised of vector elements, wherein an i-th vector element thereof has a value which the condition expression included in said second statement takes at an i-th iteration of the loop;
  said second vector processing either executing or not executing said second data processing designated by said third statement for at least one element of the array data depending on a value of an element of the vector data having a same element number as said at least one element of the array data;
  said third vector processing executing said first data processing to each element of the array data after said second vector processing.

2. A method according to claim 1 wherein said second step includes:
(b1) a step of modifying said loop so as to insert in front of said first statement a fourth statement determining a value of the condition expression included in said second statement, so as to insert between said fourth and first statements a fifth statement for indicating branching when the value determined by said fourth statement is a pre-determined value, and so as to move said third statement between said fifth and first statements so that said third statement is executed in a pre-determined one of two cases, when branching is indicated by said fifth statement and when not;
(b2) a step of generating a set of vector instructions to execute said first vector processing in response to said fourth statement generating a set of vector instructions to execute said third vector processing in response to said first statement, and generating, in response to said second and fifth statements a set of at least one vector instruction for executing said second vector processing.

3. A method for computer-converting a loop comprising statements to be iteratively executed included in a source program written in a high-level language, to an object program including vector instructions to be executed by a vector processor and scalar instructions to be executed by a scalar processor, comprising:

(a) a first step of detecting a set of first to third statements included in the loop;
  said first statement indicating whether or not branching is to be made, depending on a value of a condition expression included in said first statement,
  said second statement being executed in a predetermined one of two cases, when the branching is indicated by said first statement and when not, and indicating that first data processing is to be executed to a certain element of first array data comprising a plurality of elements, wherein a vector instruction which performs a same processing as the first data processing on a set of vector elements is included in vector instructions executable by said vector processor;
  said third statement being executed in another of the two cases and indicating that second data processing is to be executed to a certain element of second array data comprising a plurality of elements, wherein a vector instruction which performs a same processing as the second data processing on a set of vector elements is not included in said vector instructions executable by said vector processor;
(b) a second step of generating in response to the detection by the first step of the set of said first, second and third statements, a set of vector instructions to be executed by said vector processor for executing first vector processing and second vector processing and a set of scalar instructions to be iteratively executed by the scalar processor;
  said first vector processing determining vector data wherein an i-th element has a value of the condition expression included in said first statement in an i-th iteration of the loop;
  said second vector processing either executing or not executing said first data processing designated by said second statement on a respective element of said first array data, depending on a respective value of a respective element of said vector data;
  said scalar instructions including a first scalar instruction for determining whether or not branching succeeds depending on a respective value of a respective element of the vector data and a second scalar instruction for executing the second data processing to a certain element of the second array data in a pre-determined one of two cases when the branching is determined by said first scalar instruction to be successful and when not.

4. A method according to claim 3, wherein said second step includes:
(b1) a step of inserting in front of said first statement a fourth statement for determining a value of the condition expression included in said first statement, substituting said first statement by a fifth statement which determines whether or not the branching has succeeded in accordance with the value determined by the fourth statement, and inserting in front of said third statement a sixth statement for determining whether the branching has succeeded or not in accordance with the value determined by said fourth statement so that said third statement is executed in a pre-determined one of two cases when the determination by said sixth statement indicates branch success and when not; and (b2) a step of generating, in response to said fourth statement, a set of at least one vector instruction for executing said first vector processing, generating in response to said second and fifth statements, a set of at least one vector instruction for executing said second vector processing and generating said set of scalar instructions in response to said sixth and third statements.

* * * * *